J. M. TUCKER.
COMBINED PLANTER AND HARROW.
APPLICATION FILED JULY 20, 1909.
939,761.
Patented Nov. 9, 1909.
2 SHEETS—SHEET 1.
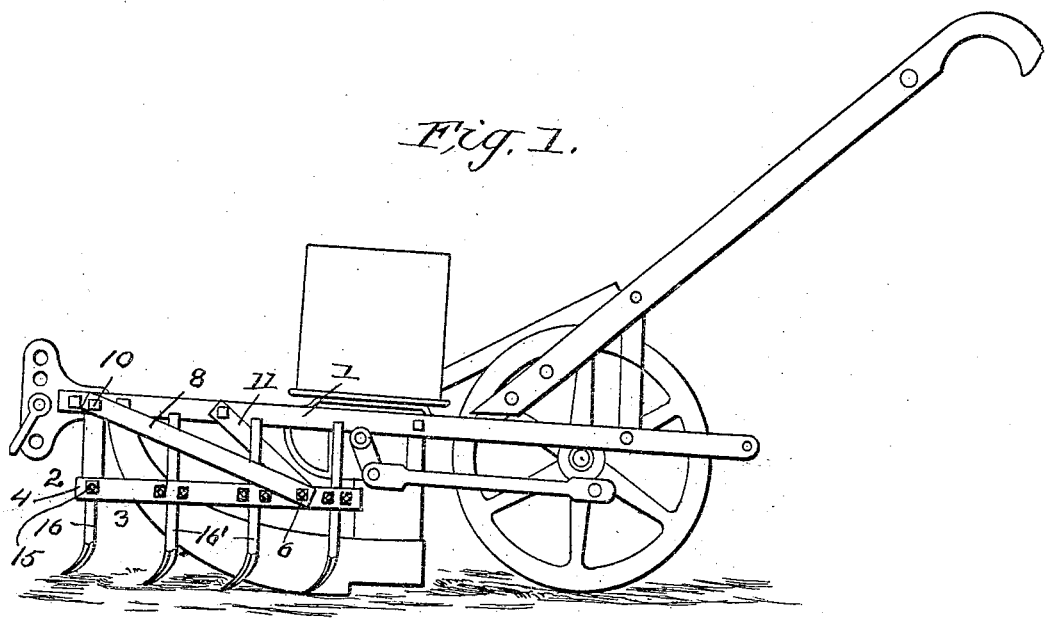
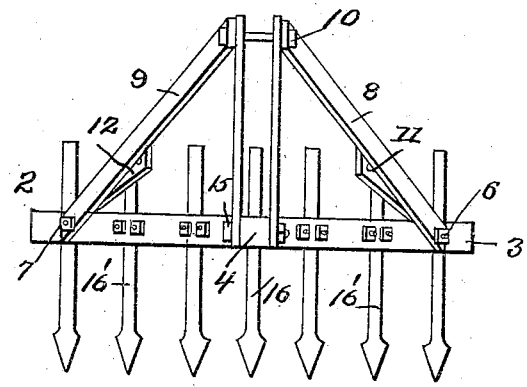
Witnesses
Jos. A. Ryan
A. S. Kitchin
Inventor
Joseph M. Tucker
By Mason Fenwick & Lawrence
his Attorneys J. M. TUCKER.
COMBINED PLANTER AND HARROW.
APPLICATION FILED JULY 20, 1909.
939,761.
Patented Nov. 9, 1909.
2 SHEETS—SHEET 2.
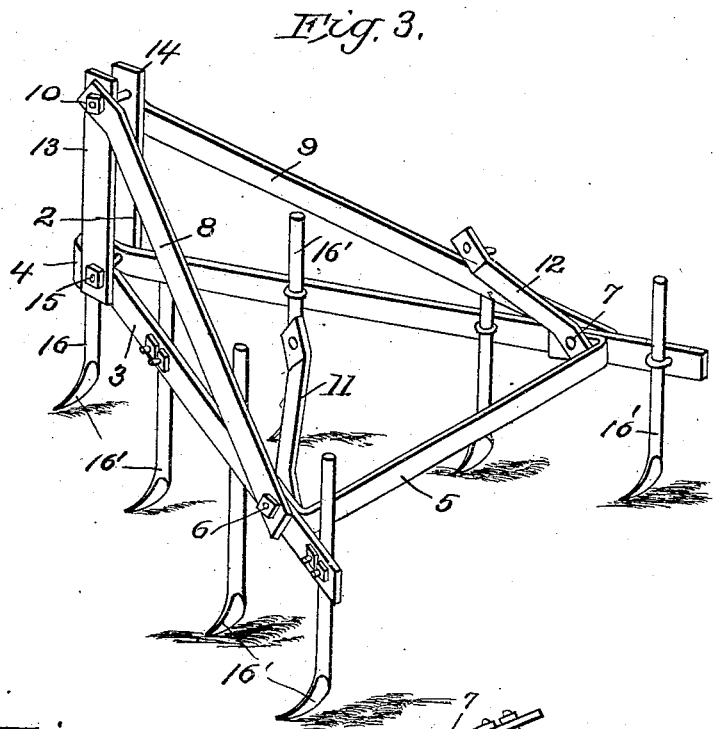
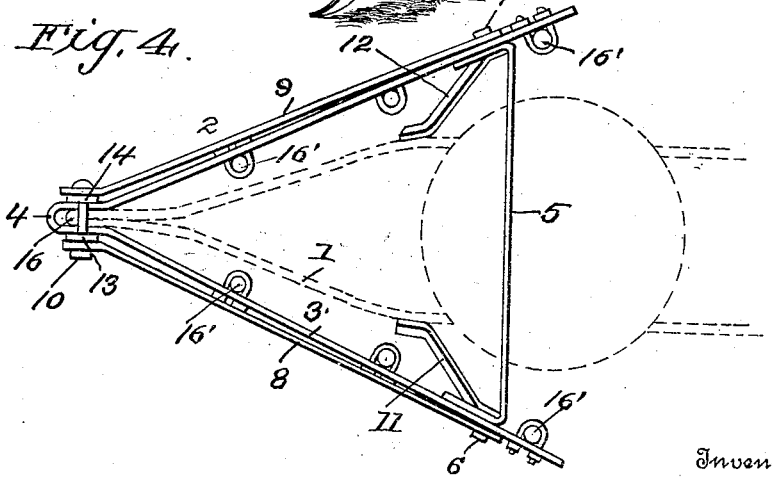

UNITED STATES PATENT OFFICE.

JOSEPH M. TUCKER, OF RIPLEY, TENNESSEE.

COMBINED PLANTER AND HARROW.

939,761.  Specification of Letters Patent.  Patented Nov. 9, 1909.

Application filed July 20, 1909. Serial No. 508,585.

*To all whom it may concern:*

Be it known that I, JOSEPH M. TUCKER, a citizen of the United States, residing at Ripley, in the county of Lauderdale and State of Tennessee, have invented certain new and useful Improvements in Combined Planters and Harrows; and I do hereby declare the following to be a full, clear, and exact description of the invention, such as will enable others skilled in the art to which it appertains to make and use the same.

This invention relates to improvements in combined corn and cotton planters, and harrows therefor, and particularly to the arrangement of harrow for pulverizing the ground as the combined machine passes thereover.

The object in view is the arrangement of a harrow upon a planter so as to pulverize the ground in immediate proximity to the planter, and to level the ground as the planter passes thereover.

Another object of the invention is the arrangement of a harrow on a planter for pulverizing the ground over which the planter passes, the harrow being shown secured to the planter and braced so as to hold the teeth of the harrow at any desired height, and any desired distance from the planter, and at a proper angle thereto for accomplishing the work for which the same is designed.

A still further object of the invention is the arrangement of a harrow with a frame for carrying harrow teeth, and a plurality of braces for stiffening and supporting said frame in a predetermined relationship for holding the harrow teeth in a predetermined relationship to each other.

With these and other objects in view the invention comprises certain novel constructions, combinations and arrangement of parts as will be hereinafter more fully described and claimed.

In the accompanying drawings: Figure 1 is a side elevation of the combined planter and harrow. Fig. 2 is a front view of the harrow removed. Fig. 3 is a perspective view of the harrow. Fig. 4 is a top plan view of the harrow, with part of the body of the planter shown in dotted lines.

Referring to the accompanying drawings by numerals, 1 indicates the body of a planter of any desired kind, as for instance a combined corn and cotton planter, to which is secured a harrow 2. The harrow 2 is provided with a frame 3 bent upon itself at 4, so as to form a substantially V shaped frame. The frame 3 is braced near its rear end by a cross bar 5 which is rigidly secured to the frame by suitable means, as bolts 6 and 7. Extending upward from frame 3 and secured thereto by bolts 6 and 7 are braces 8 and 9 which extend in a slanting direction, from near the rear of the harrow to a position near and above the front of the harrow where the same are secured to the frame 1 of the planter by any desired means, as for instance, by means of bolts 10. Also there are arranged braces 11 and 12 which have passed therethrough bolts 6 and 7 for connecting the same with frame 3. These braces 11 and 12 extend upward at an angle and are secured at their upper ends to frame 1 by any suitable means, as for instance bolts. The upper ends of braces 11 and 12 are arranged to be preferably substantially above the center of the harrow. By this arrangement of a plurality of braces the frame 3 is held properly in position, and the tension or strain thereof is substantially equally distributed. Secured to the front of the frame 3 are a plurality of uprights 13 and 14 which are connected with frame 3 by a bolt 15. Bolt 15 is also designed to cause tooth 16 to be clamped in position. Uprights 13 and 14 are positioned beneath the front ends of members 8 and 9, and are connected with frame 1 by bolt 10, so as to support and hold the front of frame 3 properly in position. Connected with frame 3 by suitable means, as U-bolts, are a plurality of harrow teeth 16' which are arranged V shaped with tooth 16 as the point of the V. The teeth 16' and tooth 16 may be adjusted up and down as desired for accommodating frames of varying heights, and also for permitting the teeth to be forced into the ground to a greater or less extent.

In operation the planter is drawn across the field for planting either cotton or corn, or other seed, and the harrow teeth are adjusted to project downward until the same are substantially even with the general surface of the ground, so that in the movement of the machine the harrow will break up any clods or parts of earth projecting above the normal surface. It will be evident that if desired the teeth may be adjusted so as to enter the earth to a greater or lesser extent for stirring and cultivating the same, as well as for more thoroughly pulverizing the earth.

What I claim is:

1. In a device of the character described, the combination with a planter formed with a frame, of a harrow formed with a substantially V shaped frame, means for connecting said harrow frame to the planter frame at the front end thereof, a plurality of teeth secured to said harrow frame, and a plurality of spaced means for bracing said harrow frame and also connecting the same with said planter frame.

2. In a device of the character described, the combination with a planter formed with a frame, of a harrow comprising a frame, means for connecting said harrow frame with said planter near the front end thereof, a plurality of inclined braces connecting the rear of said harrow frame with said planter frame, said braces being spaced apart at their upper ends, and a cross brace for holding spaced apart the rear ends of said harrow frame.

In testimony whereof I affix my signature in presence of two witnesses.

JOSEPH M. TUCKER.

Witnesses:
C. R. BARBEE,
W. DAN MAJORS.